(12) United States Patent  (10) Patent No.: US 9,261,030 B2
Mitchell et al.  (45) Date of Patent: Feb. 16, 2016

(54) AUTOMATIC FUEL SHUTOFF (71) Applicant: Kohler Co., Kohler, WI (US)

(72) Inventors: Chris Mitchell, Cedarburg, WI (US); Gary Stenz, Mt. Calvary, WI (US); Daniel F. Krueger, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 166 days.

(21) Appl. No.: 13/897,899

(22) Filed: May 20, 2013

(65) Prior Publication Data

US 2014/0338634 A1 Nov. 20, 2014

(51) Int. Cl.
*F02M 63/02* (2006.01)
*F02D 17/04* (2006.01)
*F02D 33/00* (2006.01)
*F02P 11/02* (2006.01)
*F02M 5/00* (2006.01)
*F02D 9/02* (2006.01)
*F02D 1/00* (2006.01)
*F02D 9/00* (2006.01)
(Continued)

(52) U.S. Cl.
CPC ............. *F02D 17/04* (2013.01); *F02D 33/006* (2013.01); *F02M 5/00* (2013.01); *F02P 11/025* (2013.01); *F02D 1/00* (2013.01); *F02D 9/00* (2013.01); *F02D 9/02* (2013.01); *F02D 41/042* (2013.01); *F02D 2700/0233* (2013.01); *F02N 3/02* (2013.01)

(58) Field of Classification Search
CPC ............. F02D 9/00; F02D 1/00; F02D 9/02; F02D 17/04; F02D 2700/0233
USPC ........................................................ 123/332
See application file for complete search history.

(56) References Cited

U.S. PATENT DOCUMENTS 262,632 A   8/1882  Whittaker
2,908,263 A  10/1959 Brown
(Continued)

FOREIGN PATENT DOCUMENTS

DE  4120876       12/1992
EP  0348706 A2    1/1990
(Continued)

OTHER PUBLICATIONS

Kohler Co., Kohler Command Pro CH260-CH440 Service Manual, 2011, http://www.kohlerengines.com/onlinecatalog/pdf/sm_17_690_01.pdf.
(Continued)

*Primary Examiner* — Lindsay Low
*Assistant Examiner* — Charles Brauch
(74) *Attorney, Agent, or Firm* — Lempia Summerfield Katz LLC (57) ABSTRACT

A combination lever for a carburetor is an integrated shutoff lever and fuel valve. The combination lever includes a longitudinal portion for a handle and a cylindrical portion including a fuel path for the fuel valve. A carburetor casing is shaped to form a valve chamber and a carburetor chamber. The valve chamber supports the cylindrical portion. A directional cavity formed in the cylindrical portion of the combination lever regulates a flow of fuel to the carburetor chamber according to a rotation of the combination lever. At one position the directional cavity opens the fuel path so that fuel flows into the carburetor chamber. At another position the directional cavity closes the fuel path so that the flow of fuel is blocked. The combination lever may also include an abutment portion to engage a switch for completing an electrical shutoff path to an engine coupled to the carburetor.

18 Claims, 11 Drawing Sheets

(51) Int. Cl.
*F02D 41/04* (2006.01)
*F02N 3/02* (2006.01)

(56) References Cited

U.S. PATENT DOCUMENTS

| | | | |
|---|---|---|---|
| 3,376,890 A | 4/1968 | Fischer et al. |
| 3,390,921 A | 7/1968 | Klimek |
| 3,596,644 A | 8/1971 | Hutchins |
| 3,626,919 A | 12/1971 | MacMillan |
| 3,749,069 A | 7/1973 | Reese |
| 3,805,760 A | 4/1974 | Yagi et al. |
| 3,820,326 A | 6/1974 | Inoue et al. |
| 3,823,700 A | 7/1974 | Gumtow |
| 3,847,034 A | 11/1974 | Hemens |
| 4,030,465 A | 6/1977 | Nakagami et al. |
| 4,058,105 A | 11/1977 | Schellin et al. |
| 4,067,306 A | 1/1978 | Berich et al. |
| 4,079,708 A | 3/1978 | Wieland et al. |
| 4,254,064 A | 3/1981 | Bernauer et al. |
| 4,457,271 A | 7/1984 | Fitch |
| 4,490,309 A | 12/1984 | Fujikawa et al. |
| 4,510,739 A | 4/1985 | Dluhosch |
| 4,517,942 A | 5/1985 | Pirkey et al. |
| 4,577,597 A * | 3/1986 | Tomita ................ 123/73 A |
| 4,631,153 A | 12/1986 | Tamba et al. |
| 4,773,371 A | 9/1988 | Stenz |
| 4,860,608 A | 8/1989 | Kobayashi |
| 4,903,670 A | 2/1990 | Bauder |
| 5,092,295 A | 3/1992 | Kobayashi |
| 5,163,401 A | 11/1992 | Reese |
| 5,174,255 A | 12/1992 | Collins et al. |
| 5,203,302 A | 4/1993 | Parnitzke |
| 5,209,196 A | 5/1993 | Nickel et al. |
| 5,211,144 A | 5/1993 | Collins et al. |
| 5,301,644 A | 4/1994 | Olmr |
| 5,581,986 A | 12/1996 | Calver |
| 6,082,323 A | 7/2000 | Winberg |
| 6,202,989 B1 | 3/2001 | Pattullo |
| 6,213,083 B1 | 4/2001 | Winberg |
| 6,419,420 B2 | 7/2002 | Hedlund |
| 6,439,547 B1 | 8/2002 | King et al. |
| 6,454,245 B2 | 9/2002 | Kobayashi |
| 6,481,415 B1 | 11/2002 | Cook |
| 6,550,749 B2 | 4/2003 | Vick |
| 6,598,586 B2 | 7/2003 | Deschamps et al. |
| 6,691,683 B2 | 2/2004 | Gracyalny et al. |
| 6,698,397 B2 | 3/2004 | Cook |
| 6,729,298 B1 | 5/2004 | Sterr |
| 6,761,145 B2 | 7/2004 | Matsuda et al. |
| 6,855,091 B1 | 2/2005 | Holmes |
| 6,857,410 B2 | 2/2005 | Davis et al. |
| 6,986,340 B2 | 1/2006 | Gracyalny et al. |
| 7,069,915 B2 | 7/2006 | Brandenburg et al. |
| 7,097,163 B2 | 8/2006 | Moriyama et al. |
| 7,104,258 B2 | 9/2006 | Yamada et al. |
| 7,118,097 B2 | 10/2006 | Moriyama et al. |
| 7,146,962 B2 | 12/2006 | Sugimoto et al. |
| 7,152,580 B2 | 12/2006 | Wetor et al. |
| 7,165,532 B2 | 1/2007 | Steffes et al. |
| 7,231,900 B1 | 6/2007 | Hanshaw |
| 7,263,981 B2 | 9/2007 | Woody |
| 7,404,546 B2 | 7/2008 | Prager et al. |
| 7,424,884 B2 | 9/2008 | Woody |
| 7,568,472 B2 | 8/2009 | Woody |
| 7,950,366 B2 | 5/2011 | Arai et al. |
| 8,240,639 B2 | 8/2012 | Roth |
| 8,408,183 B2 | 4/2013 | Johnson |
| 2003/0075132 A1 | 4/2003 | Ohsawa et al. |
| 2009/0260596 A1 | 10/2009 | Johnson |
| 2011/0114055 A1 * | 5/2011 | Naegele et al. ........ 123/198 DB |
| 2011/0226217 A1 | 9/2011 | Raasch |

FOREIGN PATENT DOCUMENTS

| | | |
|---|---|---|
| EP | 2112355 | 10/2009 |
| EP | 2112355 A1 * | 10/2009 |
| GB | 970399 | 9/1964 |
| JP | 3053245 | 10/1998 |
| JP | 2000220478 | 8/2000 |
| JP | 2002147304 | 5/2002 |
| JP | 2002363915 | 12/2002 |
| JP | 2003171910 | 6/2003 |
| JP | 3990651 | 10/2007 |

OTHER PUBLICATIONS

EM1800X—EM2500X, Owner's Manual, 1991, Honda Power Equipment.
Grisso et al., G89-948 Safe Operation of Compact Tractors, 1989, University of Nebraska, Lincoln.
European Search Report for related European Application No. 14190912.7-1606, dated Jun. 22, 2015.

* cited by examiner

AUTOMATIC FUEL SHUTOFF

TECHNICAL FIELD

This disclosure relates in general to an automatic fuel shutoff process or system for an internal combustion engine, or more particularly, to a manual shutoff lever integrated with a fuel valve and/or an electrical shutoff switch for an internal combustion engine.

BACKGROUND

Small internal combustion engines are used in a variety of devices including, but not limited to, chainsaws, lawn mowers, weed trimmers, all-terrain vehicles, wood splitters, pressure washers, garden tillers, snow blowers, or other devices. A small engine is often started with a pull cord rather than a key. The user pulls the pull cord to rotate a recoil pulley and thereby start the engine. The engine may be stopped in a variety of techniques. For example, the user may lower the throttle to a point that insufficient fuel reaches the engine. The user may let the engine run to allow the engine to eventually run out of gas. The user may overload the engine to force shutoff. For example, a lawnmower pushed into heavy grass quickly may be overloaded to the point of causing the engine to cease operation.

Finally, the small engine may include a manual kill switch that allows the user to immediately stop the engine from running. However, challenges remain in the simplification of kill switches and integration of kill switches with other controls of the small engine.

BRIEF DESCRIPTION OF THE DRAWINGS

Exemplary embodiments of the present embodiments are described herein with reference to the following drawings.

DETAILED DESCRIPTION

The following example systems may include a carburetor for an internal combustion engine and/or an automatic fuel shutoff device for the carburetor. The automatic fuel shutoff device may be a combination shutoff lever, fuel valve, and electrical shutoff mechanism. A handle portion of the automatic fuel shutoff device may be rotated or otherwise moved manually by a user. The movement of the handle portion rotates the fuel valve portion in mechanical cooperation with the carburetor to control a flow of fuel to the carburetor. The movement of the handle portion may also be translated to an electrical shutoff mechanism that actuates a switch to electrically disable operation of the internal combustion engine.

Figure 1:
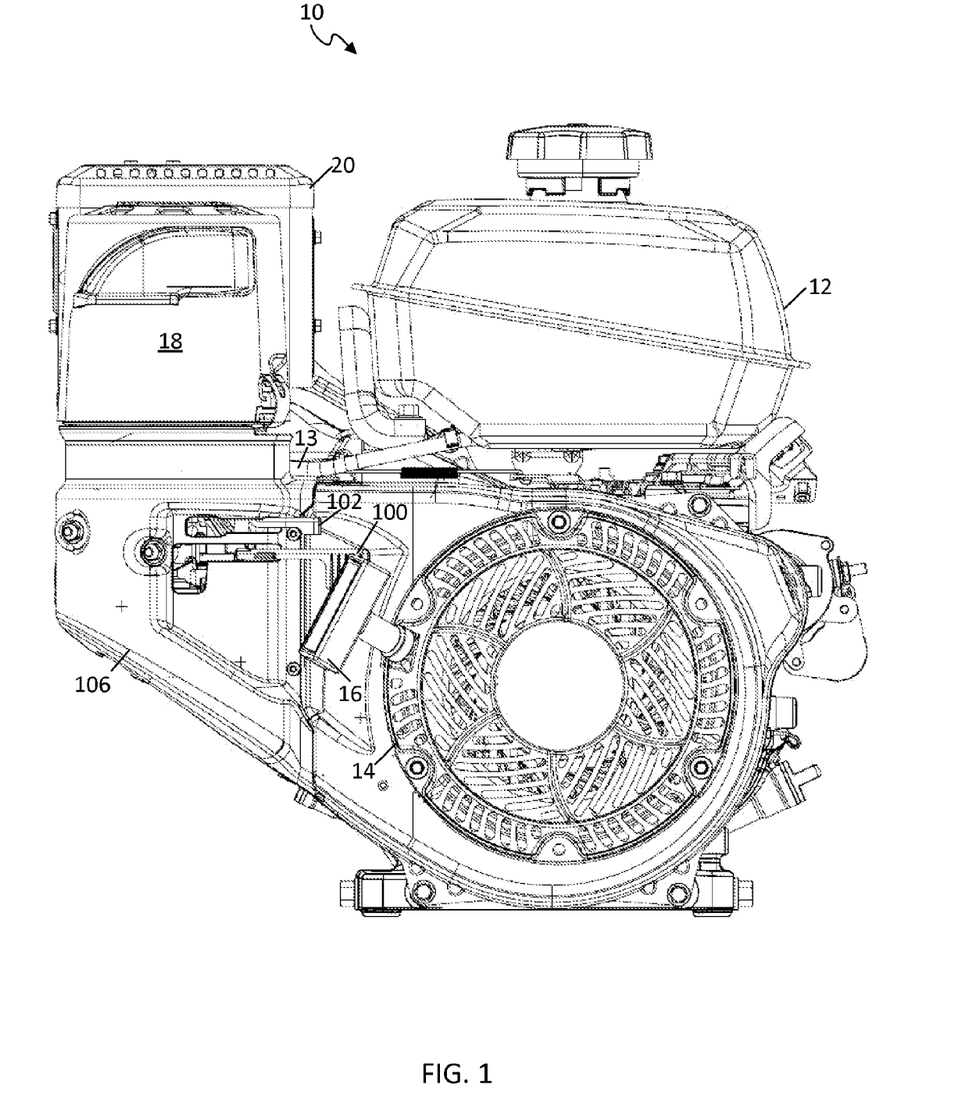
FIG. 1 illustrates an example internal combustion engine.

FIG. 1 illustrates an example internal combustion engine 10. The engine 10 may be any type of engine in which the combustion of a fuel (e.g., gasoline or another liquid fuel) with an oxidizer (e.g., air) in a chamber applies a force to a drive component (e.g., piston, turbine, or another component) of the engine 10. The drive component rotates or otherwise moves to perform work. The engine 10 may power a chainsaw, lawn mower, weed trimmer, all-terrain vehicle, boat engine, go kart, wood splitter, pressure washer, garden tiller, snow blower, or another device. The engine 10 may be a two-stroke engine or a four-stroke engine. The size of the engine 10 may vary depending on the application. For example, the size of the engine 10 for a chain saw may be 1.5 cubic inches to 2.8 cubic inches, the size of the engine 10 for a lawn mower may be 50 cubic inches to 149 cubic inches, and the size of the engine 10 for an all-terrain vehicle may be 200 cubic inches to 748 cubic inches. The size of the engine 10 may be larger or smaller.

FIG. 1 illustrates example external components of the engine 10 or coupled with the engine 10. The external components may include a fuel tank 12, a fuel line 13, a retractable starter 14, a starter handle 16, an air cleaning system 18, a muffler 20 and a control portion. The phrases "coupled with" or "coupled to" include directly connected to or indirectly connected through one or more intermediate components. Additional, different, or fewer components may be provided. For example, a governor system, a throttle system, and/or a lubrication system may also be included, and an electronic starter system may be used in place of the retractable starter 14.

The fuel tank 12 stores fuel (e.g., gasoline), which may be delivered by fuel line 13 to a carburetor. The carburetor, which is partially hidden in FIG. 1, is coupled with the engine 10 behind carburetor cover 106. The fuel line 13 may be a flexible tube made of plastic or rubber and extending from the fuel tank 12 to the carburetor.

The starter handle 16 may be part of the retractable starter 14 including a rope or cable coiled around a crankshaft. When the starter handle 16 is pulled, the crankshaft spins, which starts the engine 10. Other engine starting components may be used with other engine variations.

The air cleaning system 18 prevents particulates or abrasive matter from entering the cylinders of the engine 10. Air enters the air cleaning system 18 through an air intake port. The air cleaning system 18 may include a mesh screen, foam cleaner, an air filter, or any other components or combinations thereof. After combustion, exhaust air leaves the engine 10 through the muffler 20. Other engines 10 may eliminate some components, or substitute or add additional components.

Figure 2:
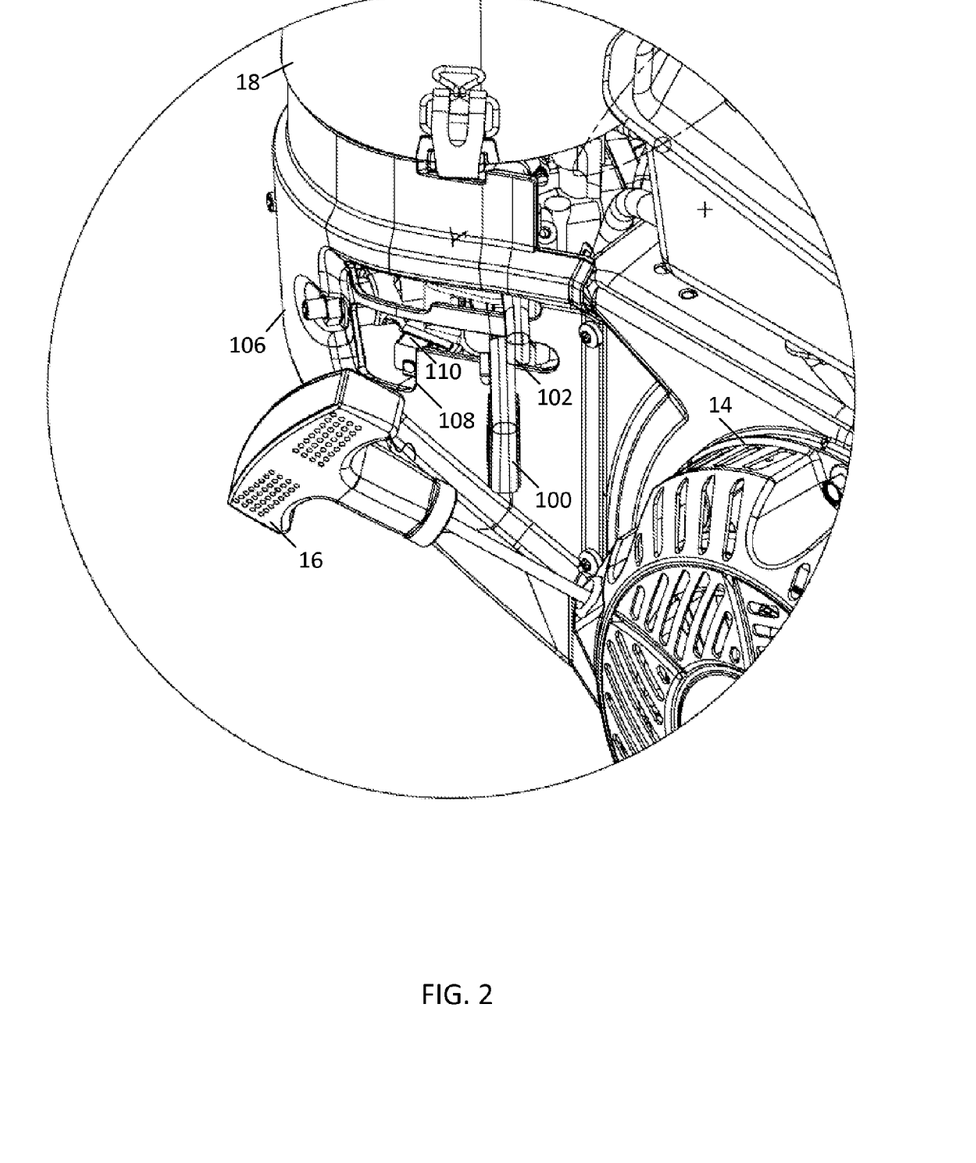
FIG. 2 illustrates a detailed view of a control portion of an example internal combustion engine.

FIG. 2 illustrates a detailed view of the control portion of an example internal combustion engine. The carburetor cover 106 encases the carburetor and connections to the control portion. The carburetor cover 106 includes a window 108. The control portion includes a combination lever 100, a choke lever 102, and an automatic shutoff switch 110. The combination lever 100 and the choke lever 102 may partially pass through the window 108 when the carburetor cover 106 is secured to the engine 10. The window 108 may be any number of sizes and/or shapes. For example, the window 108 may be sized and shaped to allow the combination lever 100 and the choke lever 102 to move with a sufficient range of motion to initiate and/or terminate corresponding functions.

The combination lever 100 may perform multiple functions. The combination lever 100 may be a manual fuel shutoff setting. Secondly, the combination lever 100 may integrate a fuel valve for regulating the flow of fuel. Finally, the combination lever 100 may actuate the shutoff switch 110.

The combination lever 100 may be formed as a single construction. The term "single construction" indicates that no moving parts or components are included within the combination lever 100. For example, the fuel valve portion of the combination lever 100 does not pivot, rotate, or move with respect to the handle portion of the combination lever 100. The term "single construction" may also refer to the process for forming the combination lever 100. That is, the combination lever 100, including the handle portion, the fuel valve portion and/or the switch actuation portion may be formed from a single mold. The combination lever 100 may be formed from any non-conductive material. The material may have a low conductivity for heat and/or a low conductivity for electricity. The material may be a rigid material with a low flexibility. Example materials include any type of Nylon (e.g., Nylon X), resin, plastic, or another material. In other embodiments, the combination lever 100 may be formed from more than one part. For example, the fuel valve portion of the combination lever 100 and the handle portion of the combination lever 100 may be separate parts that are attached to one another using, for example, a fastener such as a screw or an adhesive.

Figure 3:
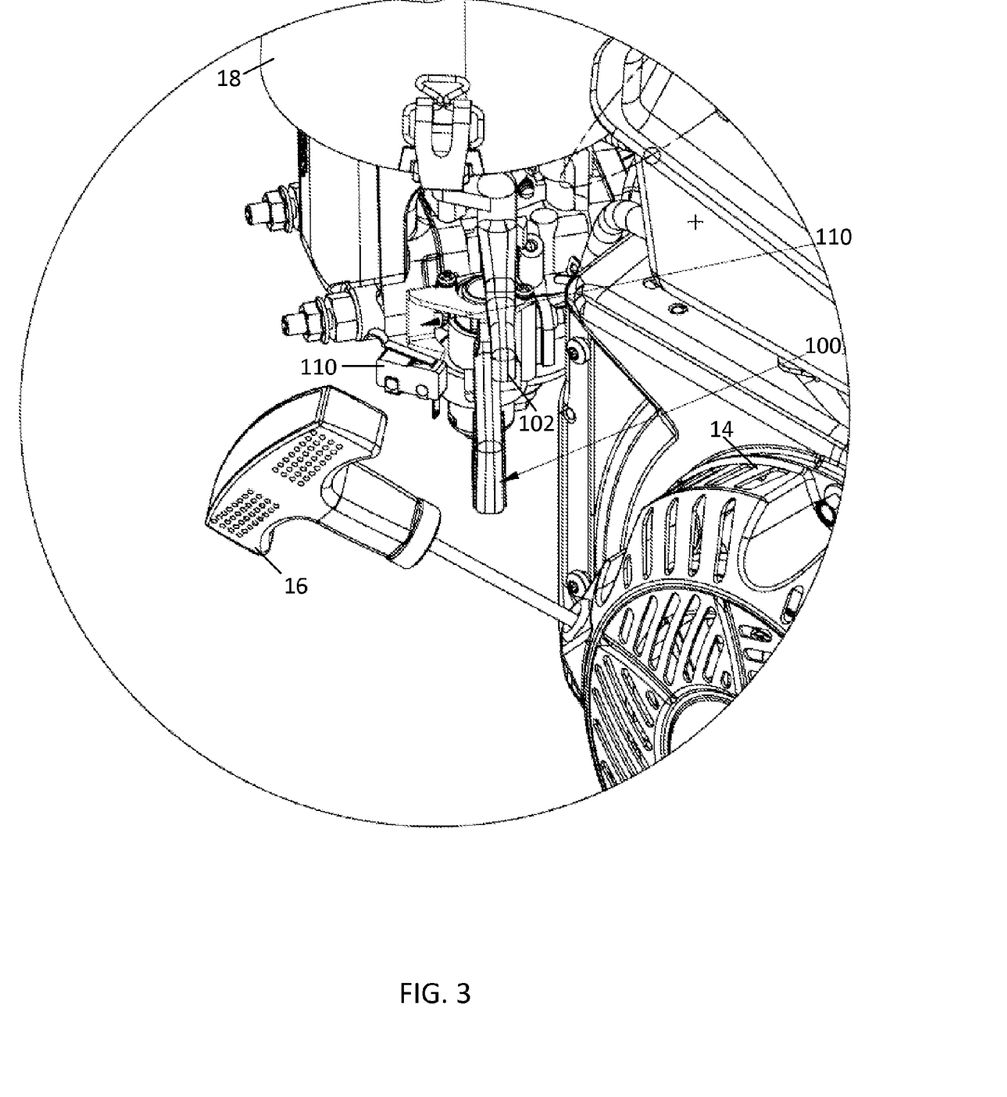
FIG. 3 illustrates another detailed view of a control portion of an example internal combustion engine.
Figure 4:
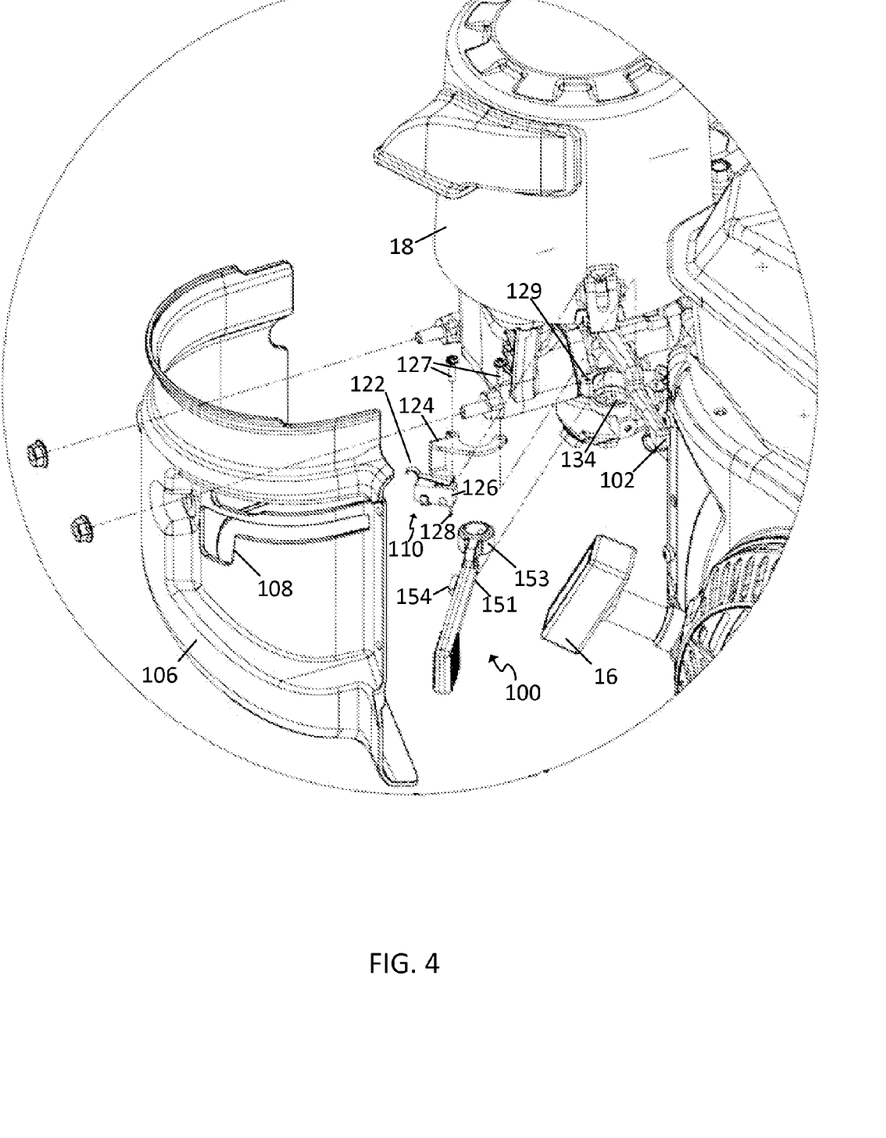
FIG. 4 illustrates an exploded view of a control portion of an example internal combustion engine.

FIG. 3 illustrates another detailed view of the control portion of the example internal combustion engine with the carburetor cover 106 removed. FIG. 4 illustrates an exploded view of the control portion of a similar internal combustion engine.

The combination lever 100 may include a longitudinal portion 151 and a cylindrical portion 153. The longitudinal portion 151 may form a handle to receive a force from the user. As the longitudinal portion 151 is rotated one direction (e.g., counter clockwise) the flow of fuel into the carburetor is increased, and as the longitudinal portion 151 is rotated in another direction (e.g., clockwise), the flow of fuel into the carburetor is decreased. Other movements of the longitudinal portion 151 and/or the cylindrical portion 153 may be initiated to change the flow of fuel into the carburetor (e.g., translational movement of the cylindrical portion 153). On the underside of the cylindrical portion 153 a directional cavity is formed in the combination lever 100 and configured to regulate a flow of fuel to the carburetor according to a rotation of the combination lever 100.

In addition, the longitudinal portion 151 includes an abutment portion 154 configured to engage a switch 110 for completing an electrical shutoff path to the engine 10 coupled to the carburetor. The abutment portion 154 is shown as an abutment protrusion. However, the abutment portion 154 may be the edge of the combination lever 100. That is, the abutment portion 154 may be flush with the surface of the combination lever. The abutment portion 154 of the combination lever 100 may engage the switch 110 in response to rotation of the combination lever 100. The switch 110 includes an engagement portion 122, a base portion 126, and a contact tab 128. The switch 110 may complete the electrical shutoff by connecting a sparkplug of engine 10 to an electrical ground, which immediately stops operation of the engine 10. For example, a wire may extend from the sparkplug of engine 10 to the contact tab 128. Another contact of the switch 10 is connected to a chassis of the engine 10. When the switch 110 is engaged, a connection is completed from the chassis of the engine 10 to the sparkplug, disabling the operation of the engine 10.

The switch 110 may also include a mounting bracket 124. The mounting bracket 124 couples the switch 110 to the engine 10. The mounting bracket 124 may also couple the combination lever 100 to the engine 10. The mounting bracket 124 may not connect to the engine shroud or carburetor cover 106. Instead, the mounting bracket may be directly fastened to the carburetor using fasteners 127 (e.g., bolts, screws, tabs, or welds). The fasteners 127 couple both the switch 110 and the combination lever 100 to the engine 10 via the fastener receptacles 129. Each of the fastener receptacles 129 may be a hole or recess that is sized and optionally threaded to receive the fasteners 127. In one embodiment, no fastener receptacles 129 are provided, and the mounting bracket is screwed into or affixed to the engine 10. More or fewer portions of the combination lever 100 and/or the switch 110 may be provided.

The switch 110 is actuated in a direction perpendicular to the movement of the combination lever 100. Because the switch 110 and the combination lever 100 operate in a perpendicular arrangement, a smaller space is required that if the switch 110 and the combination lever 100 operated in parallel planes.

In one example, the combination lever 100 may be configured to rotate in a horizontal plane and the engagement portion 122 of the switch 110 may be configured to be engaged in the vertical direction. The vertical direction is substantially in the direction of gravity, depending on the orientation of the engine 10. The combination lever 100 is configured to linearly depress the engagement portion 122 substantially in the vertical direction. The term substantially, as used herein, with respect to directions includes a range of directions across a predetermined angle. Examples of the predetermined angle include 1 degree, 5 degrees, 10 degrees, or 0.2 radians. As illustrated, the switch 110 may be a normally opened switch in which a default position of the switch 110 is open. That is, the engagement portion 122 may be biased such that the switch 110 is opened (i.e., no electrical path to contact tab 128 has been completed). The engagement portion 122 may be biased by a spring within the base portion 126.

Alternatively, the engagement portion 122 may be formed from a spring (e.g., a cantilever spring or a single-layered leaf spring). For example, the engagement portion 122 may be a tipping point mechanism or an over-center mechanism that is actuated by a low amount of force. This allows the switch 110 to be miniature in size, which may be referred to as a microswitch. The engagement portion 122 is anchored to the base portion 126. The over-action mechanism may produce a crisp feel and click as the engagement portion 122 receives a force in the downward direction and flexes until the internal contact is closed.

Figure 5:
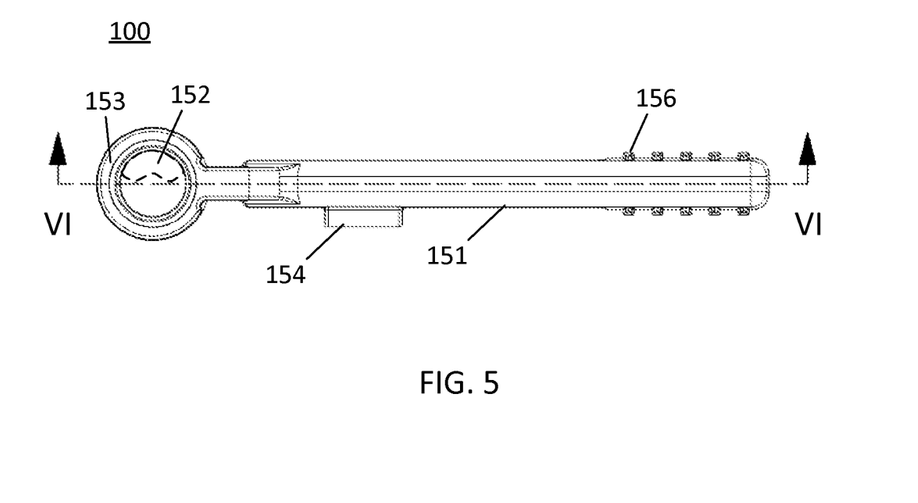
FIGS. 5 and 6 illustrate an example combination lever.
Figure 6:
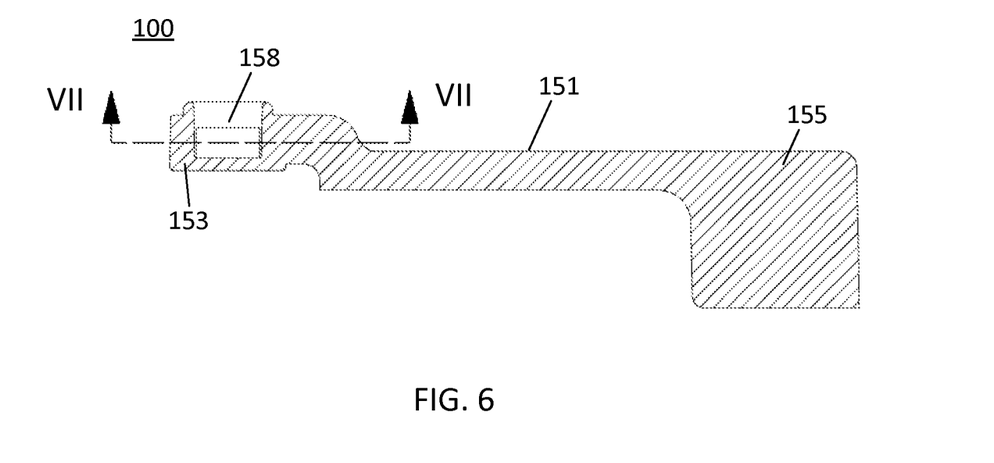
Figure 7:
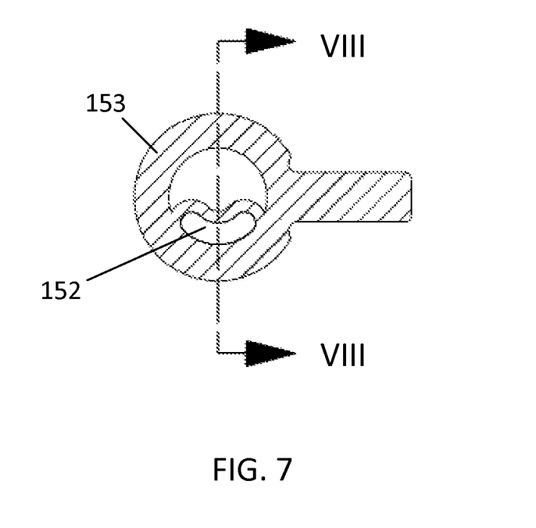
FIGS. 7 and 8 illustrate an example valve portion of the combination lever of FIGS. 5 and 6.
Figure 8:
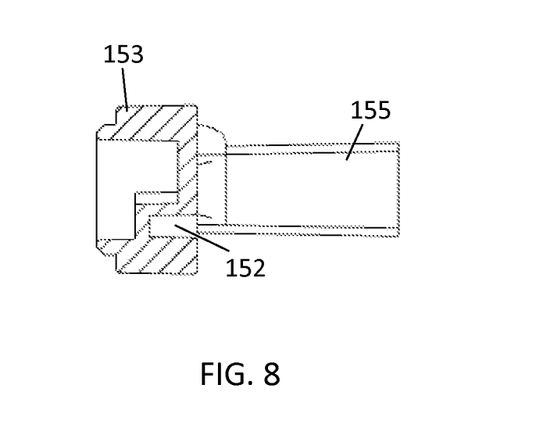

FIGS. 5-8 illustrate an example combination lever 100. FIG. 5 is a top view of the combination lever 100. FIG. 6 is a cross section taken from FIG. 5. FIGS. 7 and 8 illustrate an example valve portion of the combination lever of FIGS. 5 and 6. FIG. 7 is a cross section taken from FIG. 6, and FIG. 8 is a cross section taken from FIG. 7.

The cylindrical portion 153 includes a directional cavity 152. The directional cavity 152 may be formed in the combination lever 100. The directional cavity 152 is shown with a dotted line in the top of FIG. 5 because the directional cavity 152 may be below the surface. The directional cavity 152 may be a variety of three-dimensional shapes such as crescent shaped, cubical, rectangular prism, conical, cylindrical, a triangular prism, or another shape. The direction cavity 152 may be semi-circular and extend over a predetermined angle range of the cylindrical portion 152. The predetermined angle range may be 180 degrees, 135 degrees, 225 degrees or another angle range. The directional cavity 152 may have a constant depth or a variable depth. Examples for the depth include 1 mm, 3 mm, or another value.

The directional cavity 152 provides a connection between a fuel intake from the fuel tank 12 and an output path to the carburetor. In one embodiment, the directional cavity 152 may be a separate part from the cylindrical portion 153, and the directional cavity 152 may be inserted and fixed into a recess in the cylindrical portion 153.

Various alignments may be used to connect the directional cavity 152 with the fuel intake and the output path. The connection may be aligned and may be sealed by a gasket 134, as shown in FIG. 4. In one example, an off position involves no overlap between the direction 152 and the fuel intake and the output path. As the combination lever 100 rotates, the directional cavity 152 and the fuel intake begin to overlap. After a predetermined amount of rotation, the directional cavity 152 also begins to overlap the output path, which allows a small amount of fuel to enter the carburetor. As the combination lever 100 rotates more, the directional cavity 152 overlaps the output path more until a maximum amount of fuel is allowed to enter the carburetor. A stop member may stop the rotation of the combination lever at or near the maximum setting.

The fuel intake and the output path are in communication with the directional cavity 152 in a direction perpendicular to the rotation of the combination lever 100. Therefore, at the directional cavity, the output path and the fuel intake are substantially parallel and substantially perpendicular to the rotation of the combination lever. The direction perpendicular to the rotation of the combination lever 100 may be in the direction of gravity when the engine is positioned on a surface parallel to the surface of the Earth.

Figure 10:
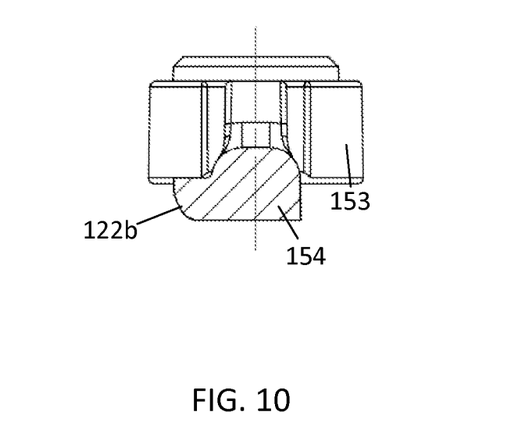

The abutment portion 154 may have a variety of shapes. The abutment portion 154 may be selected to create a low friction engagement with the switch 110. For example, the abutment portion 154 may include a rounded surface 122b, as shown by FIG. 10, configured to create a low friction engagement with a rounded portion of the engagement portion 122 of the switch 110. Alternatively, the engagement portion 122 of the switch 110 may be configured to engage directly with the surface of the combination lever 100. In other words, the abutment portion 154 is flush with the surrounding surface of the combination lever.

The combination lever 100 also includes a handle 155 with a grip member 156. The grip member 156 may not be integrally formed with the combination lever 100. The grip member 156 may include strips of a material that allows the user to easily identify and rotate the combination lever 100. The material may be rubber, plastic, or a polymer. Alternatively, the grip member 156 may be integrally formed with the combination lever 100. The combination lever 100 may include a recess 158 formed in the cylindrical portion 153. The recess 158 may receive a seal (e.g., end cap 142 in FIG. 12) for enclosing and shielding the valve portion including the direction cavity 152 from the environment.

Figure 9:
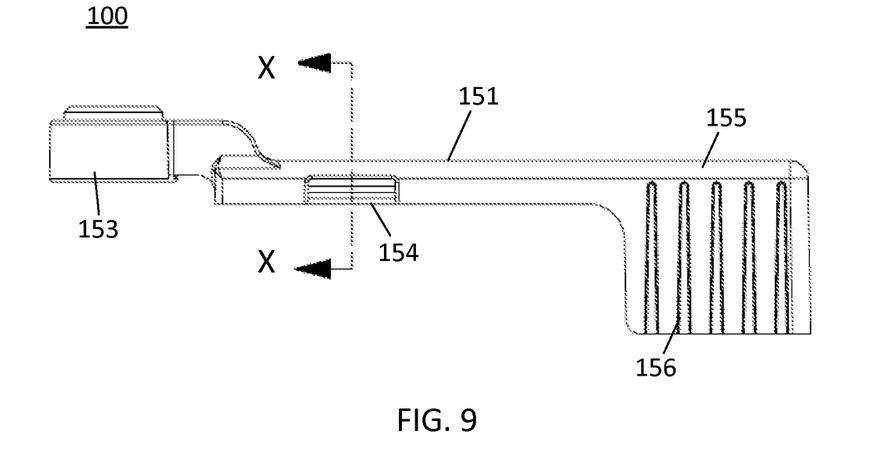
FIGS. 9 and 10 illustrate additional example views of the combination lever of FIGS. 5-8.

FIG. 9 is a side view of the combination lever 100. FIG. 10, as indicated, illustrates a cross section of the combination lever 100. As shown in FIG. 10, the abutment portion 154 includes rounded surface 122b, which is configured to engage the rounded portion 122a of the switch 10. The rounded surface 122b may be integrally formed with the combination lever 100.

Figure 11:
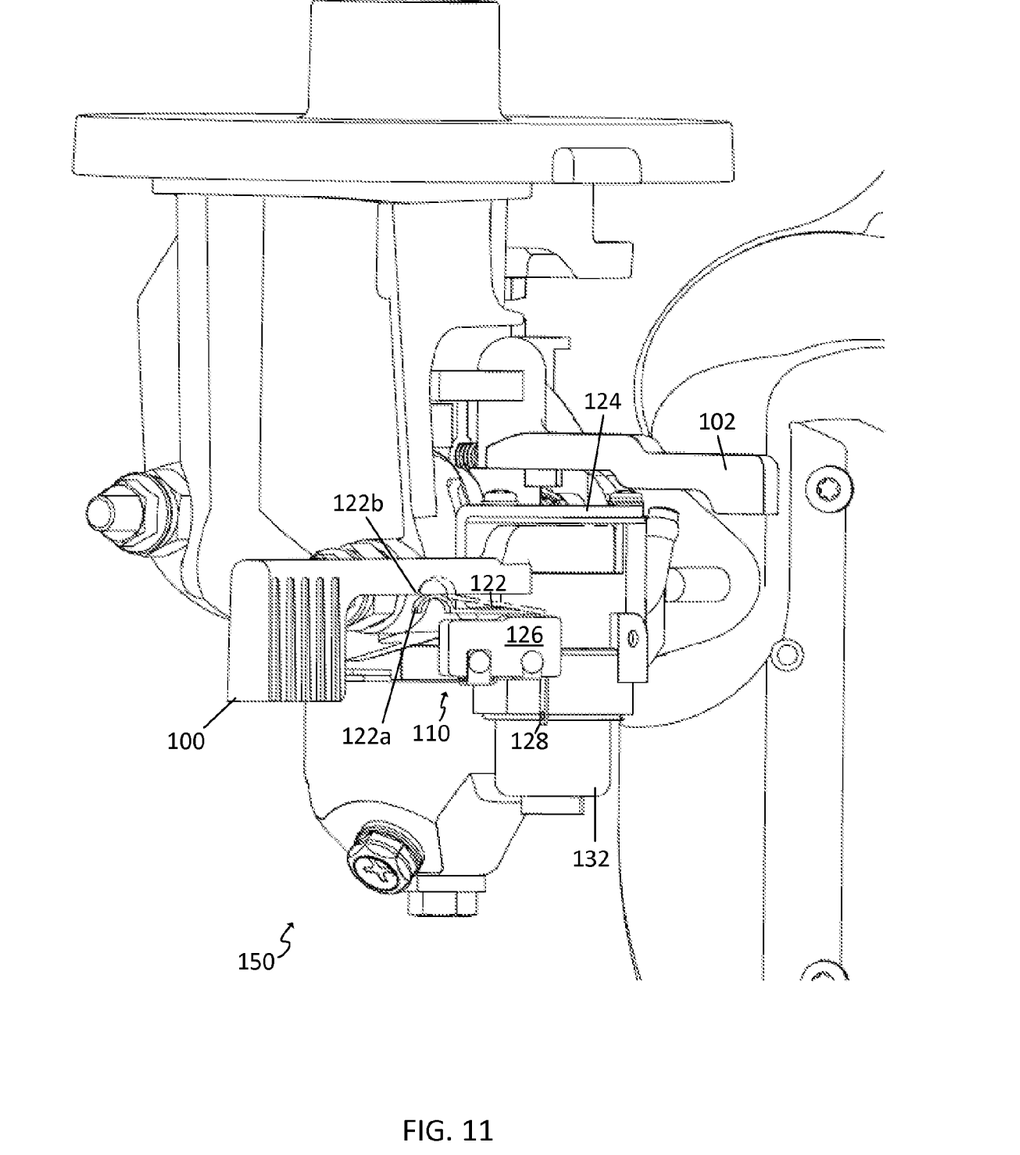
FIG. 11 illustrates another view of a control portion in a shutoff state.

FIG. 11 illustrates another view of a control portion in a shutoff state. The mounting bracket 124 is configured to secure the combination lever 100 and the switch 110 directly to the carburetor 150. The mounting bracket 124 is fastened to the carburetor 150 at a position above the combination lever 100 and below the choke lever 102.

The switch 110 may be normally in the open position, which corresponds to the engagement portion 122 biased outward, as shown by the dotted lines in FIG. 11. When the combination lever 100 is rotated, the combination lever 100 slides above the engagement portion 122 and depresses the engagement portion in substantially the vertical direction. When the engagement portion is displaced a predetermined distance in the vertical direction (e.g., 1 mm, 2 mm, or another value), the switch 110 moves to the closed position. The closed position completes an electric path from the chassis of the engine 10 through the contact tab 128 to a spark plug of the engine 10, which immediately causes the engine 10 to cease operation.

Figure 12:
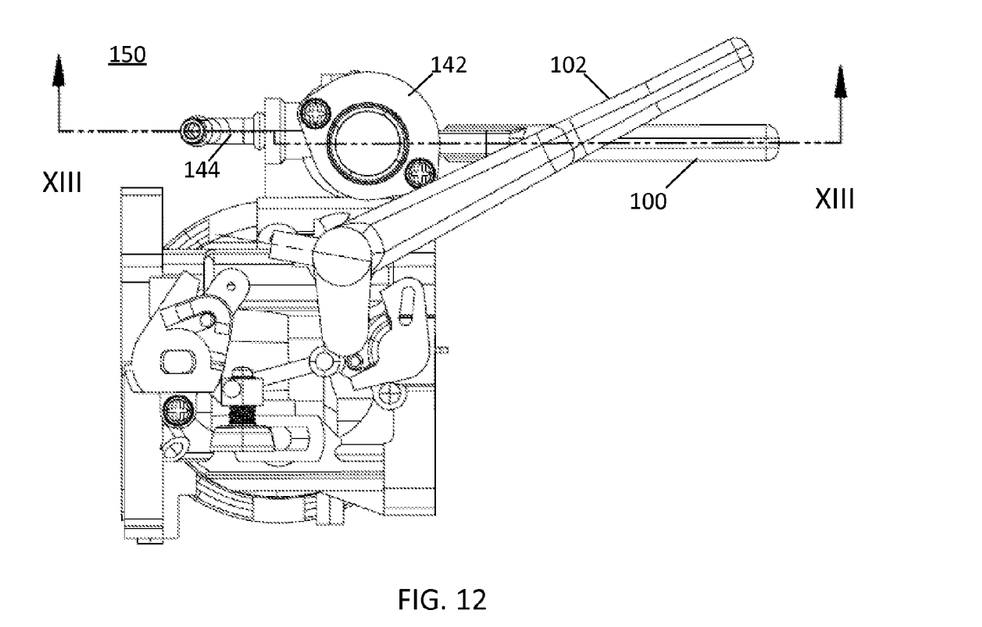
FIGS. 12 and 13 illustrate an example carburetor of an internal combustion engine.
Figure 13:
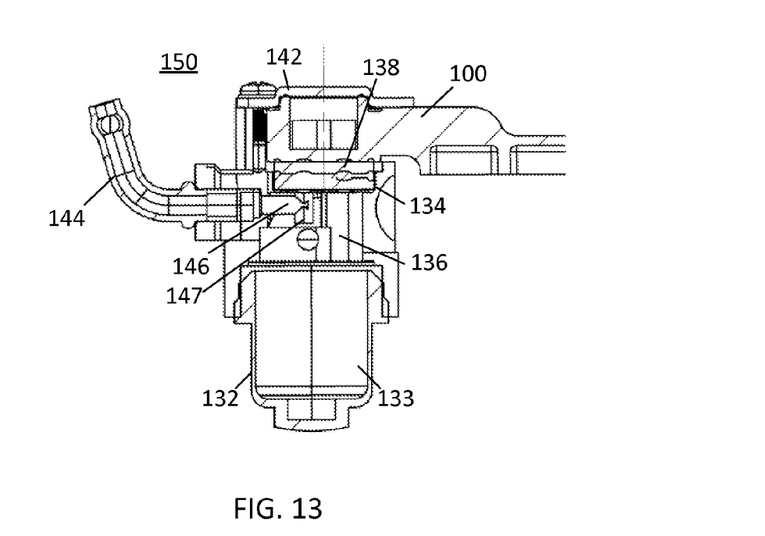

FIG. 12 illustrates an example carburetor 150 of the internal combustion engine 10. The carburetor 150, which may incorporate the control portion for the carburetor 150, may include the choke lever 102, the combination lever 100, a fuel intake 144, an end cap 142, and various other components. The combination lever 100 may be referred to as a fuel delivery system for the carburetor 150. FIG. 13 illustrates a cross section of FIG. 11. FIG. 13 further illustrates a sealing gasket 134, a fuel valve chamber 138, a carburetor chamber 133, a carburetor casing 132, an input nozzle 146, an output tube 136, and various other components.

The carburetor 150 includes a chassis or casing 132 that is shaped to form the fuel valve chamber 138 and the carburetor chamber 133, which may be referred to as a fuel bowl. The fuel valve chamber 138 supports the cylindrical portion 153 of the combination lever 100. The fuel valve chamber 138 supports the sealing gasket 134, which is configured to align the directional cavity 152 of the cylindrical portion 153 with the fuel intake path, including the input nozzle 146 and the intake 144, and with the output tube 136 that leads to the carburetor chamber 133.

The sealing gasket 134 may be disk-shaped or cylindrical. The sealing gasket 134 includes a plurality of through holes. A first of the through holes corresponds to the fuel intake path. A second of the through holes corresponds to the output tube 136. The first and second through holes are in configurable alignment with the directional cavity 152 through the rotation of the combination lever 100. Additional through holes may be included to secure the sealing gasket 134 to the casing 132 of the carburetor 150 by mating to protrusions of the casing 132 in the fuel valve chamber 138.

The output tube 136 connects to the fuel valve chamber 138 in a vertical direction. The input nozzle 146 is coupled with an input tube 147, which connects to the fuel valve chamber 138 in the vertical direction. The vertical direction is perpendicular to a plane including the rotation of the combination lever 100.

The carburetor 150 may be a single-barrel carburetor. The carburetor 150 is configured to mix fuel and air in a predetermined ratio of fuel to air. If the proportion of fuel to air is too high, the engine 10 may flood. If the proportion of fuel to air is too low, the engine 10 may die or be damaged. In order to regular the ratio of fuel to air, the carburetor 150 controls the flow of air into the carburetor chamber 133.

The amount of air into the carburetor chamber 133 is controlled by an adjustable throttle plate that extends across the carburetor chamber 133. A throttle system (not shown) rotates the adjustable throttle plate. The carburetor chamber 133 includes a narrow portion (venturi), which creates a relative vacuum that draws in fuel from a jet. The venturi may be tuned to change the metered amount of fuel that is drawn through the jet at full throttle.

When the engine is cold, a rich fuel mixture may be needed to start the engine 10. A choke plate, which is configured to cover the venturi, forms a choke valve to control a flow of air into the carburetor chamber 133. The venturi is positioned between the choke plate and the fuel valve chamber 138. When the choke is activated by the choke lever 102, more fuel is drawn by the jet, which allows the cold engine to fire once or twice. Then the choke lever 102 is rotated to open the choke plate, which causes the engine 10 to run normally. The choke lever 102 may be configured to rotate in a plane substantially parallel to the rotation of the combination lever 100.

The carburetor chamber 133 may also include a float. The float is configured to maintain a continually replenished supply of fuel. The float, which floats in the fuel, controls an inlet valve. As the fuel is used up, the float begins to sink, which opens the inlet valve and allows more fuel to enter the carburetor chamber 133.

Figure 14:
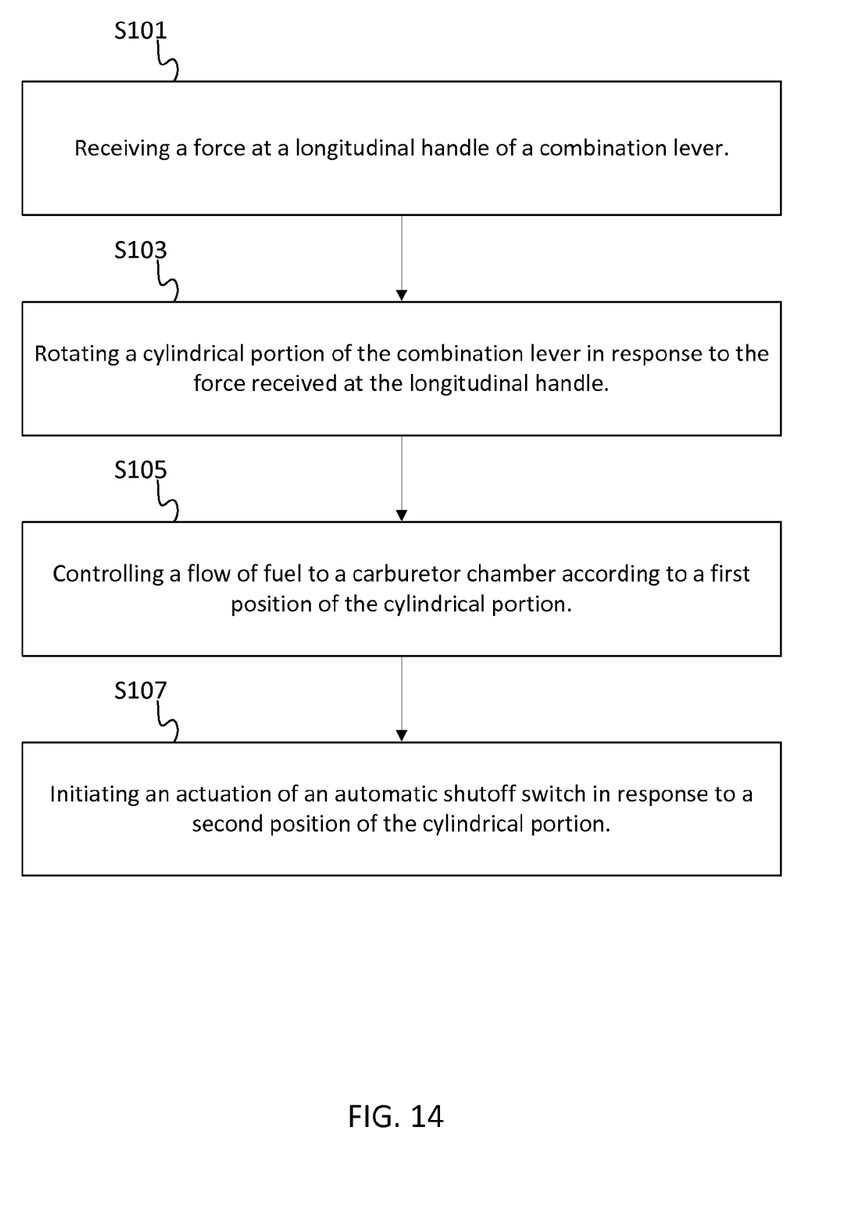
FIG. 14 illustrates an example flowchart for operation of an internal combustion engine.

FIG. 14 illustrates an example flowchart for operation of an internal combustion engine. The acts in FIG. 14 may be performed by a combination lever or another combination of components of the engine 10. Additional, different, or fewer acts may be provided. The acts are performed in the order shown or other orders. The acts may also be repeated.

At act S101, the combination lever receives a force at a longitudinal handle of the combination lever. In addition to the longitudinal handle, the combination lever includes a fuel valve portion with a fuel path and a protrusion for actuating a shutoff switch. The fuel valve portion, the longitudinal handle, and the protrusion are integrally formed. The force is received from a user of the engine. The force may be translated into a rotational motion of the combination lever.

At act S103, the combination lever rotates the cylindrical portion of the combination lever in response to the force received at the longitudinal handle. The cylindrical portion receives the flow of fuel at a cavity formed in the cylindrical portion from a fuel intake path and dispenses the flow of fuel from the cavity formed in the cylindrical portion to a path to a carburetor chamber. At least at the fluid connections to the cylindrical portions, the path to the carburetor chamber is substantially parallel to the fuel intake path.

At act S105, a flow of fuel through the flow path is controlled by the rotation of the combination lever. The fuel path connects a fuel valve chamber to a carburetor chamber. Depending on a position of the combination lever, the fuel valve allows the fuel to flow into the carburetor chamber or block the flow into the carburetor chamber. The flow of fuel into the carburetor chamber may be enabled at an ON position of the combination lever and blocked at a blocking position of the combination lever. The blocking position may be a predetermined angular distance (e.g., 45 degrees) from the ON position.

At act S107, the combination lever initiates an actuation of an automatic shutoff switch. Depending on the position of the combination lever, the protrusion engages the automatic shutoff switch. The default position of the automatic shutoff switch is open so that a circuit through the automatic shutoff switch is not complete. When the protrusion actuates the automatic shutoff switch, the circuit is completed, allowing an electrical current to flow through the switch, which grounds the engine. When the engine is grounded, at least one piston does not fire, and the device powered by the engine is disabled.

Figure 15:
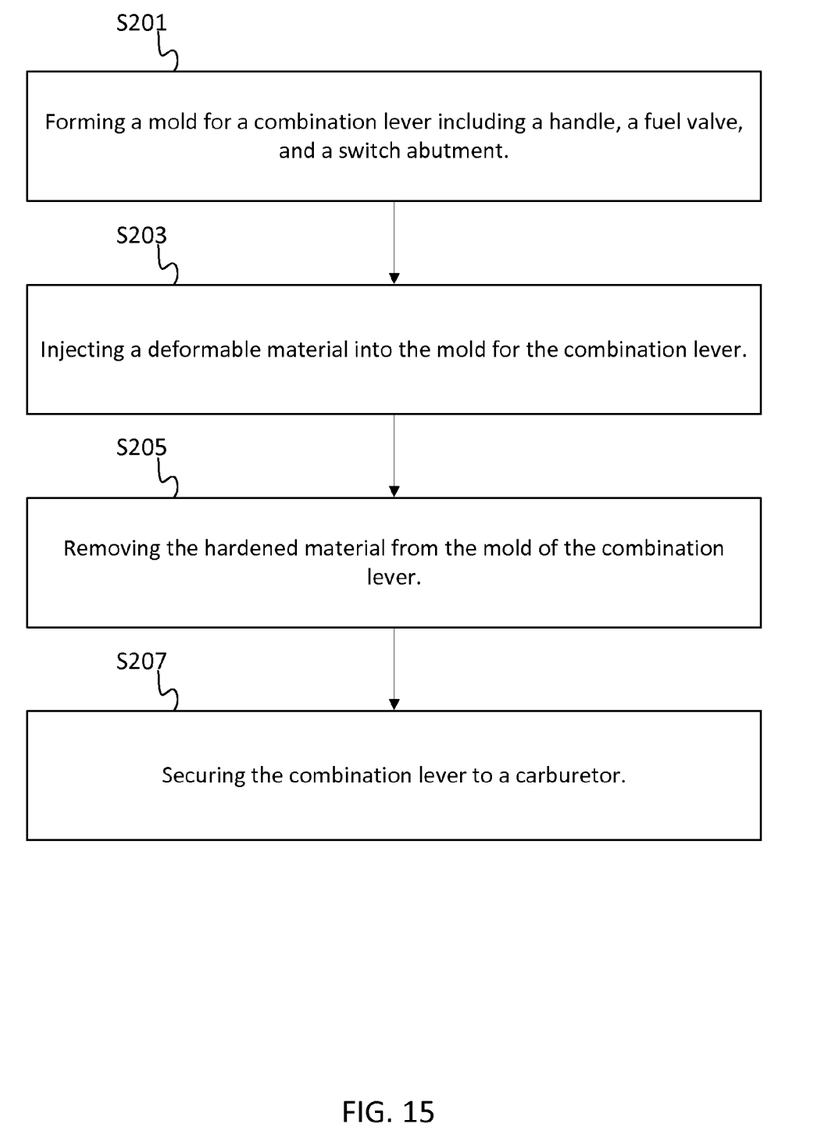
FIG. 15 illustrates an example flowchart for manufacturing the combination lever.

FIG. 15 illustrates an example flowchart for manufacturing a combination lever. Additional, different, or fewer acts may be provided. The acts are performed in the order shown or other orders. The acts may also be repeated. At act S201, a mold for a combination lever is formed. The mold includes a handle portion, a fuel valve portion, and a switch abutment portion. The handle portion is shaped to form the longitudinal portion of the combination lever. The fuel valve portion is shaped to form the fuel valve of the combination lever, including the directional cavity. The switch abutment portion is shaped to form a protrusion in the combination lever for abutting the engagement portion of the switch.

At act S203, a deformable material is injected or poured into the mold. The deformable material may be a liquid such as plastic, thermoplastic polymers, thermosetting polymers, silicone, or resin. The mold may include a release agent that prevents the deformable material from bonding to the mold as the deformable material hardens. The deformable material takes the shape of the mold. In one example, as the deformable material cools, the deformable material hardens to a rigid material. In another example, heating, curing or another technique is used to harden the deformable material into the combination lever.

At act S205, the combination lever including the hardened material is removed from the mold. The combination lever includes a manual shutoff lever including a grip, a fuel valve including a fuel path, and an electrical shutoff mechanism for engaging a microswitch. The movement of the manual shutoff lever is translated to the fuel valve to stop the flow of fuel to the carburetor, and/or the movement of the manual shutoff lever may be translated to an electrical shutoff mechanism, which electrically disables operation of the internal combustion engine.

At act S207, the combination lever is secured to the carburetor using fasteners and/or a mounting bracket. A single mounting bracket may secure the manual shutoff lever, the fuel valve, and the electrical shutoff mechanism to the carburetor.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A carburetor comprising:
    a carburetor chamber configured to mix air and fuel;
    a fuel valve chamber configured to supply the fuel to the carburetor chamber;
    a carburetor chassis including the fuel valve chamber and the carburetor chamber;
    a combination lever including a longitudinal handle and a cylindrical portion, wherein the fuel valve chamber is configured to support the cylindrical portion;
    a directional cavity formed in the cylindrical portion of the combination lever and configured to regulate a supply of the fuel to the carburetor chamber according to a rotation of the combination lever; and
    an abutment portion of the combination lever configured to engage a switch for completing an electrical shutoff path to an engine coupled to the carburetor,
    wherein the directional cavity of the cylindrical portion of the combination lever is configured to receive the flow of fuel from a fuel intake and deliver the flow of fuel, through the directional cavity, to the carburetor chamber through an output path, wherein the fuel intake and the output path are in a direction substantially perpendicular to the rotation of the combination lever.

2. The carburetor of claim 1, wherein the abutment portion of the combination lever is configured to linearly engage the switch in response to the rotation of the combination lever.

3. The carburetor of claim 2, wherein the abutment is configured to vertically depress a rounded portion of the switch to complete an electrical connection to kill the engine coupled with the carburetor.

4. The carburetor of claim 1, further comprising:
    a choke valve in the carburetor chamber, wherein the choke valve is configured to control a flow of air into the carburetor; and
    a venturi between the choke valve and the fuel valve chamber, wherein the venturi is configured to create a vacuum pressure for drawing fuel into the carburetor chamber from the fuel valve chamber.

5. A method comprising:
    receiving a force at a longitudinal handle of a combination lever;
    rotating a cylindrical portion of the combination lever in response to the force received at the longitudinal handle, wherein the longitudinal handle is integrally formed with the cylindrical portion;
    controlling a flow of fuel to a carburetor chamber according to a first position of the combination lever and a directional cavity formed in the cylindrical portion, wherein controlling the flow of fuel to the carburetor chamber comprises:
        receiving the flow of fuel at the directional cavity formed in the cylindrical portion from a first path; and
        dispensing the flow of fuel from the directional cavity formed in the cylindrical portion to a second path, wherein the first path is substantially parallel to the second path; and
    initiating an actuation of an automatic shutoff switch in response to a second position of the combination lever, wherein the automatic shutoff switch is configured to complete an electrical connection to cease operation of an engine.

6. The method of claim 5, wherein the carburetor chamber is integrally housed in a casing along with a valve chamber configured to support the cylindrical portion of the combination lever.

7. The method of claim 5, wherein controlling the flow of fuel to the carburetor comprises stopping the flow of fuel to the carburetor at the first position of the combination lever.

8. The method of claim 5, wherein the actuation of the automatic shutoff switch is in a direction substantially perpendicular to the force at the longitudinal handle of the combination lever.

9. An apparatus comprising:
    a casing shaped to form a valve chamber and a carburetor chamber;
    a combination lever including a longitudinal portion and a cylindrical portion, wherein the valve chamber of the casing is configured to support the cylindrical portion;
    a directional cavity formed in the cylindrical portion of the combination lever and configured to regulate a flow of fuel to the carburetor chamber according to a rotation of the combination lever; and
    an abutment portion of the combination lever configured to engage a switch for completing an electrical shutoff path to an engine coupled to the apparatus, wherein the abutment portion of the combination lever is configured to engage the switch in response to the rotation of the combination lever,
wherein the directional cavity of the cylindrical portion of the combination lever is configured to receive the flow of fuel from a fuel intake and deliver the flow of fuel through the directional cavity to an output path.

10. The apparatus of claim 9, wherein the fuel intake and the output path are parallel.

11. The apparatus of claim 10, wherein the fuel intake and the output path are in a direction perpendicular to the rotation of the combination lever.

12. The apparatus of claim 10, further comprising:
a disk-shaped gasket configured to connect and align the directional cavity of the cylindrical portion of the combination lever to the fuel intake and to the output path to the carburetor chamber.

13. The apparatus of claim 9, wherein the combination lever is configured to depress the switch in a substantially vertical direction.

14. The apparatus of claim 13, wherein the switch is an automatic shutoff switch, and the abutment portion is a first rounded abutment integrally formed with the combination lever configured to contact a second rounded abutment of the automatic shutoff switch to perform the actuation on the automatic shutoff switch.

15. The apparatus of claim 14, wherein a default position of the automatic shutoff switch is open.

16. The apparatus of claim 9, wherein the carburetor chamber includes a float bowl portion.

17. The apparatus of claim 9, wherein the combination lever including the longitudinal portion and the cylindrical portion is formed from a single mold.

18. The apparatus of claim 9, further comprising:
a fastener receptacle configured to receive a fastener for securing the switch and the combination lever to the apparatus.

* * * * *